(12) United States Patent
Silk et al.

(10) Patent No.: US 11,946,796 B2
(45) Date of Patent: Apr. 2, 2024

(54) CONTAINER LOAD QUALITY MONITORING AND FEEDBACK SYSTEM

(71) Applicant: ZEBRA TECHNOLOGIES CORPORATION, Lincolnshire, IL (US)

(72) Inventors: Seth David Silk, Barrington, IL (US); Andrew Ehlers, Elmhurst, IL (US); Nirav Shah, Harrow (GB); Peter S. Carberry, IV, Seattle, WA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 412 days.

(21) Appl. No.: 17/405,529

(22) Filed: Aug. 18, 2021

(65) Prior Publication Data

US 2023/0053372 A1 Feb. 23, 2023

(51) Int. Cl.
*G01G 3/147* (2006.01)
*B65D 88/54* (2006.01)
*G01F 23/26* (2022.01)
*G01G 21/28* (2006.01)

(52) U.S. Cl.
CPC ............. *G01G 3/147* (2013.01); *B65D 88/54* (2013.01); *G01F 23/26* (2013.01); *G01G 21/283* (2013.01)

(58) Field of Classification Search
CPC ......... G01F 23/26; G01F 17/00; G06Q 50/28; G06Q 10/08; G06Q 10/06395; G01G 3/147; G01G 21/283; B65D 88/54; H04W 4/35; G01B 21/02
USPC ......................................................... 177/251
See application file for complete search history.

(56) References Cited

U.S. PATENT DOCUMENTS

| 9,930,429 | B2* | 3/2018 | Kekäläinen ............. H04Q 9/00 |
| 11,151,679 | B2* | 10/2021 | Millhouse ............. G06Q 50/28 |
| 11,460,333 | B2* | 10/2022 | Foxx-Gruensteidl ........................ G06Q 10/08 |
| 2003/0160701 | A1 | 8/2003 | Nakamura et al. |

(Continued)

OTHER PUBLICATIONS

Alessandri et al. "Modeling and feedback control for resource allocation and performance analysis in container terminals." IEEE Transactions on Intelligent Transportation Systems 9.4(2008): 601-614. Nov. 18, 2008 (Nov. 18, 2008) Retrieved on Sep. 17, 2022 (Sep. 17, 2022) from <https://iecexplore.ieee.org/abstract/document/4682727> entire document.

(Continued)

*Primary Examiner* — Jacques M Saint Surin

(57) ABSTRACT

A method of generating feedback for a container load process includes: during a load process for a container at a load bay, controlling a sensor assembly disposed at the load bay to capture sensor data depicting an interior of the container; at a computing device connected to the sensor assembly, detecting, based on the sensor data, a wall of items placed in the container interior; determining, at the computing device from the sensor data: (i) a boundary attribute of the detected wall, and (ii) a composition attribute of the detected wall; comparing, at the computing device, (i) the boundary attribute to a boundary criterion, and (ii) the composition attribute to a composition criterion; and responsive to at least one of the boundary attribute not meeting the boundary criterion, or the composition attribute not meeting the composition attribute, generating an alert for transmission to a client computing device.

19 Claims, 9 Drawing Sheets

(56) References Cited

U.S. PATENT DOCUMENTS

| | | |
|---|---|---|
| 2004/0041706 A1 | 3/2004 | Stratmoen et al. |
| 2009/0290512 A1 | 11/2009 | Twitchell, Jr. |
| 2016/0239795 A1 | 8/2016 | Burch, V et al. |
| 2019/0355144 A1 | 11/2019 | Korobov et al. |
| 2022/0164727 A1 | 5/2022 | Silk et al. |
| 2022/0299397 A1* | 9/2022 | Agan ................. G01M 3/24 |
| 2023/0112116 A1* | 4/2023 | Krishnamurthy ...... B65G 67/20 |
| | | 700/213 |

OTHER PUBLICATIONS

International Search Report and Written Opinion for International Application No. PCT/US2022/032330 dated Oct. 11, 2022.

* cited by examiner

CONTAINER LOAD QUALITY MONITORING AND FEEDBACK SYSTEM

BACKGROUND

Material handling facilities, such as warehouses and the like, are increasingly computerized to accommodate increasing volumes of freight and complexity in handling operations, while limiting the need for additional staff. Machine and computer vision technologies may be deployed to monitor container operations within such facilities, but such technologies may lack accuracy under some conditions, which may lead to inefficient allocation of resources and/or reduced container load efficiency.

SUMMARY

In an embodiment, the present invention is a method of generating feedback for a container load process, including: during a load process for a container at a load bay, controlling a sensor assembly disposed at the load bay to capture sensor data depicting an interior of the container; at a computing device connected to the sensor assembly, detecting, based on the sensor data, a wall of items placed in the container interior; determining, at the computing device from the sensor data: (i) a boundary attribute of the detected wall, and (ii) a composition attribute of the detected wall; comparing, at the computing device, (i) the boundary attribute to a boundary criterion, and (ii) the composition attribute to a composition criterion; and responsive to at least one of the boundary attribute not meeting the boundary criterion, or the composition attribute not meeting the composition attribute, generating an alert for transmission to a client computing device.

In another embodiment, the present invention is a computing device, including: a communications interface connecting the computing device with a client computing device; and a processor configured to: during a load process for a container at a load bay, control a sensor assembly disposed at the load bay to capture sensor data depicting an interior of the container; detect, based on the sensor data, a wall of items placed in the container interior; determine, at the computing device from the sensor data: (i) a boundary attribute of the detected wall, and (ii) a composition attribute of the detected wall; compare (i) the boundary attribute to a boundary criterion, and (ii) the composition attribute to a composition criterion; and responsive to at least one of the boundary attribute not meeting the boundary criterion, or the composition attribute not meeting the composition attribute, generate an alert for transmission to a client computing device.

In a further embodiment, the present invention is a system, including: a sensor assembly disposed at a load bay; and a computing device configured to: during a load process for a container at the load bay, control the sensor assembly disposed at the load bay to capture sensor data depicting an interior of the container; detect, based on the sensor data, a wall of items placed in the container interior; determine, at the computing device from the sensor data: (i) a boundary attribute of the detected wall, and (ii) a composition attribute of the detected wall; compare (i) the boundary attribute to a boundary criterion, and (ii) the composition attribute to a composition criterion; and responsive to at least one of the boundary attribute not meeting the boundary criterion, or the composition attribute not meeting the composition attribute, generate an alert for transmission to a client computing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
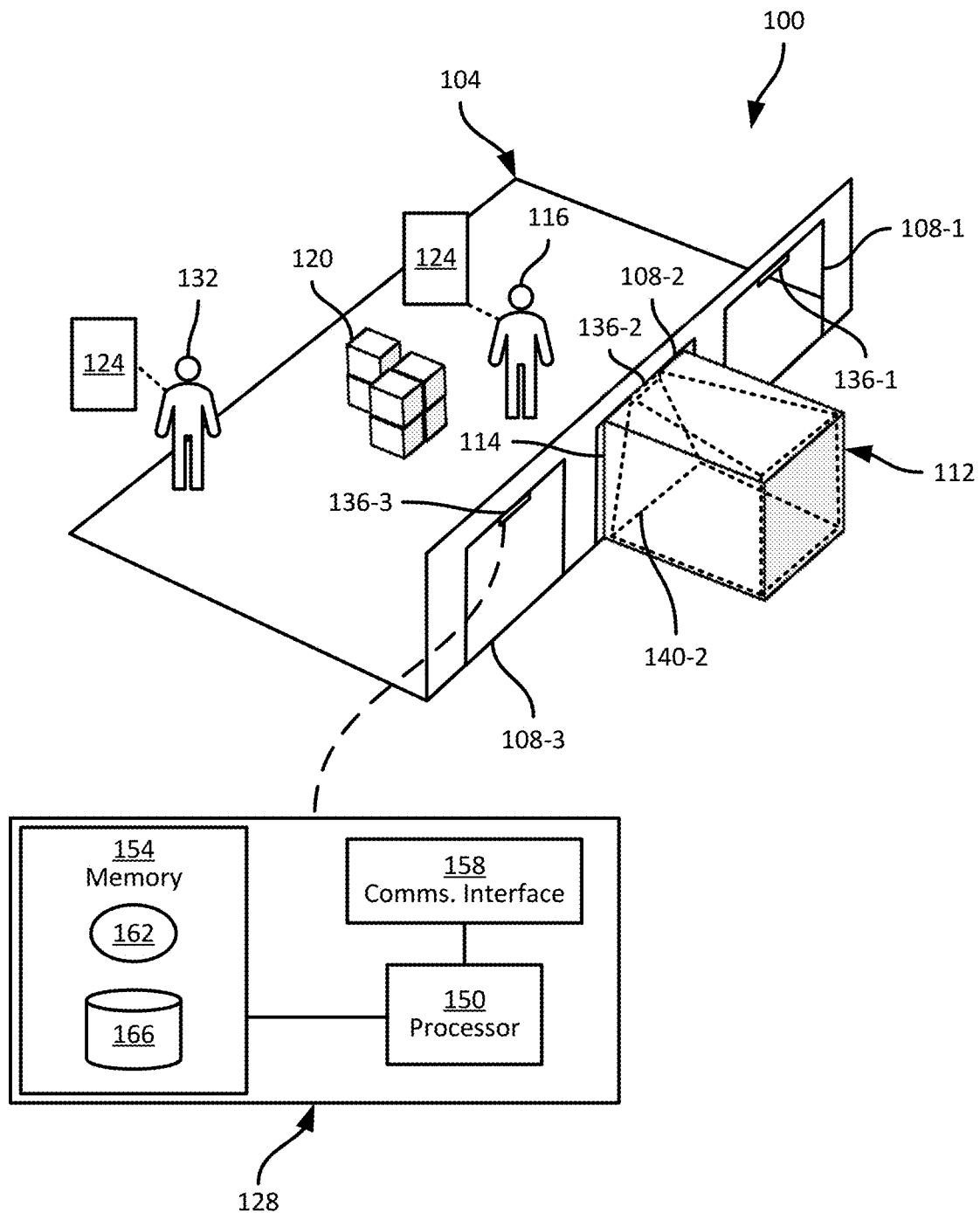
FIG. 1 is a diagram of a system for container load quality monitoring and feedback.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 depicts a container loading and unloading system 100, including a facility 104 (e.g. a warehouse, manufacturing facility, retail facility, or the like) with at least one load bay 108. As illustrated, the facility 104 includes a portion of a building such as the above mentioned warehouse or the like, such as a cross dock or portion thereof, including load bays 108. As will be apparent to those skilled in the art, the facility 104 can include other portions not illustrated in FIG. 1. In the illustrated example, three load bays 108-1, 108-2, and 108-3 are shown. The load bays 108 may, for example, be arranged along an outer wall of the facility 104, such that containers can approach the load bays from the exterior of the facility 104. In other examples, smaller or greater numbers of load bays 108 may be included. Further, although a single facility 104 is illustrated in FIG. 1, in some examples, the load bays 108 may be distributed across multiple physically distinct facilities. The load bays 108 are illustrated as being dock structures enabling access from within the facility 104 to an exterior of the facility 104 where a container 112 is placed. In other examples, one or more of the load bays 108 may be implemented as a load station within the facility 104, to load or unload containers that are handled inside the facility 104.

Each load bay 108 is configured to accommodate a container, such as the example container 112 shown in FIG. 1. In particular, the container 112 is shown at the load bay 108-2. The container 112 can be any container transportable by at least one of a vehicle, a train, a marine vessel, an airplane or the like, and configured to store transportable goods such as boxed and/or unboxed items and/or other types of freight. The container 112 may therefore be, for example, a semi-trailer including an enclosed box affixed to a platform including one or more sets of wheels and a hitch assembly for towing by a powered vehicle. In further examples, the container 112 may be the box portion of a box truck in which the container 112 is affixed to the body of the vehicle which also supports a cab, powertrain, and the like. In other examples, the container 112 can be a unit loading device (ULD) of the type employed to load luggage, freight and the like into aircraft. In such examples, the container 112 may be transported to and from load bays 108 by a vehicle such as a pallet truck or the like. In still further examples, a ULD is processed at a load bay 108 located within the facility 104 as noted above, rather than at a load bay 108 allowing access to the facility exterior.

Each load bay 108 includes an opening, e.g. in a wall of the facility 104, that enables staff and/or equipment within the facility 104 to access an interior of the container 112. For example, once the container 112 is placed at the load bay 108-2 as shown in FIG. 1, e.g. with an open end 114 of the container (e.g. a wall with a door or other opening allowing access to an interior of the container 112) substantially flush with the opening of the load bay 108-2, a worker 116 within the facility 104 can begin moving items 120 from the facility 104 into the container 112. For a loading process, when the container 112 has been filled to a target level, a door of the container 112 can be closed, and the container 112 can be withdrawn from the load bay 108-2 to make way for another container. As will now be apparent, a similar process may be implemented to unload the container 112, e.g. by the worker 116, to take delivery of items at the facility 104 for further processing. Loading and unloading processes are referred to collectively herein as "load" processes.

The facility 104 may include a significant number of load bays 108 (e.g. some facilities may include hundreds of load bays 108), as well as a significant number of workers such as the worker 116. The nature of the items 120, and therefore the size, weight and handling requirements of the items 120, may vary from container to container. Further, various other constraints may be applied to each load process, including the time available to fill a given container 112, the degree to which each container 112 is expected to be filled, and the like. Such constraints may vary over the course of a day, week, or longer time period.

The worker 116 may carry or otherwise operate a client computing device 124, such as a wearable computer, a tablet computer, a smartphone, or the like. The device 124 may receive messages, e.g. from a server 128, containing instructions for the worker 116. In other examples, the worker 116 may not be issued a computing device 124. The instructions may identify which items 120 are to be loaded into the current container 112, as well as the time available to load the container 112, the degree to which the container 112 is expected to be filled, and the like. The computing device 124 may also be mounted to a wall, suspended from the ceiling by a retention system, or other fixed portion of the facility 104 at or near the load bay 108-2. Each load bay 108 may include such a device.

Due to the variable nature of the items 120 and/or the containers 112 processed at the facility 104, as well as the complexity associated with allocating staff and containers 112 amongst potentially large numbers of load bays 108, certain load processes may, without intervention, fail to meet expected load times, fullness targets, or both.

One or more supervisors 132 may therefore also be deployed throughout the facility 104, e.g. equipped with corresponding client devices 124. As noted above, in some examples the worker 116 is not provided with a client device 124, while the supervisor is provided with such a device. In other examples, both the worker 116 and the supervisor 132 are provided with client devices 124.

The supervisor 132 may have responsibility for allocating resources to the three load bays 108 shown in FIG. 1. In some systems, however, the number of load bays 108 under management by a given supervisor may render accurate assessment of performance at each bay 108 difficult, and therefore complicate the allocation of resources to the bays 108. Further, in facilities with large numbers of bays 108, and therefore large numbers of client computing devices 124 distributed among workers 116 and supervisors 132, internal networks (e.g. wireless local area networks) may become congested, reducing the ability of facility staff to carry out load processes effectively. In addition, the number of load bays 108 under the supervision of the supervisor 132 may lead to a volume of alerts or other information received at the client device 124 of the supervisor 132 sufficient to induce user fatigue, rendering the task of processing and acting on such information difficult for the supervisor 132. In turn, such fatigue may lead to operational effects such as disrupted loading and unloading processes and the like.

The system 100 includes components and functionality to detect individual sets of the items 120 placed in the container 112, and to assess various attributes of such sets. The sets of items are also referred to as walls, as the worker 116 typically places items 120 in the container 112 by constructing a substantially vertical wall of items 120, and then constructing another wall between the first and the open end 114, and so on. The container 112, in other words, may be loaded by successive walls from the end of the container 112 furthest from the open end 114, to the open end 114.

As will be seen in the discussion below, the detection and assessment of individual walls of the items 120 throughout a load process enables the system 100 to obtain more accurate representations of container utilization (i.e. what proportion of the container interior is occupied by the items 120) than systems in which fullness is estimated simply by detecting the items 120 in the container 112 closest to the open end 114 and assuming that the container is fully occupied behind those items 120. The granular assessment of individual walls of items 120 may also enable the system 100 to convey performance instructions and feedback to the worker 116 and/or supervisor 132 via the client devices 124 that enables increased resource allocation effectiveness within the facility 104, while mitigating against network congestion and alert fatigue.

The load bays 108 include respective sensor assemblies 136-1, 136-2, and 136-3 each including at least one image and/or depth sensor. For example, each sensor assembly 136 can include an RGB camera and a depth camera. In other examples, the sensor assemblies 136 can include lidar sensors, ultrasound sensors, trip detectors, sonar devices, or the like, in addition to or instead of the above-mentioned cameras. Each sensor assembly 136 is positioned at the corresponding load bay 108 such that a field of view (FOV) 140 (the FOV 140-2 of the sensor assembly 136-2 is shown in FIG. 1) is aimed outwards from the load bay 108, into the interior of the container 112 docked at that load bay 108. In some examples, the sensor assembly 136 may be affixed to the container 112 itself, or the sensor assembly 136 can encompass sensors affixed within the container 112 as well as sensors affixed to the load bay 108.

The sensor assemblies 136 are therefore controllable, e.g. by the server 128, to capture sensor data such as images and/or point clouds corresponding to the interior of docked containers 112. The server 128, in turn, is configured to process the sensor data to detect the above-mentioned walls of items 120, and generate various attributes for each wall. In some examples, the sensor assemblies 136 themselves can include processing hardware and software to determine at least a portion of the wall attributes for subsequent use by the server 128.

The server 128 is further configured to generate certain status information, such as container utilization, which can also be employed (e.g. by the server 128 itself) to assess overall performance for the load process and generate alerts that may lead to allocation of additional resources or updating of instructions to workers 116, in order to optimize load performance.

The server 128 is also configured to compare the wall attributes to configurable criteria for assessing wall quality. Based on such comparisons, the server 128 can present alerts, e.g. along with the utilization mentioned above, to provide feedback to the worker 116 and thereby optimize the quality of subsequent walls, which may also improve the accuracy of subsequent utilization data determined by the server 128.

The server 128 includes a central processing unit (CPU), also referred to as a processor 150, interconnected with a non-transitory computer readable storage medium, such as a memory 154. The memory 154 includes any suitable combination of volatile memory (e.g. Random Access Memory (RAM)) and non-volatile memory (e.g. read only memory (ROM), Electrically Erasable Programmable Read Only Memory (EEPROM), or flash). The processor 150 and the memory 154 each comprise one or more integrated circuits (ICs).

The server 128 also includes a communications interface 158, enabling the server 128 to exchange data with other computing devices, such as the client devices 124 and/or the sensor assemblies 136. The communications interface 158 therefore includes any suitable hardware (e.g. transmitters, receivers, network interface controllers and the like) allowing the server 128 to communicate, e.g. over local and/or wide area networks.

The memory 154 stores a plurality of computer-readable instructions, e.g. in the form of a load assessment application 162. The application 162 is executable by the processor 150 to implement various functionality performed by the server 128. As will be discussed below, the application 162 implements the wall detection and assessment functions mentioned above, and the associated alert generation functions.

Figure 2:
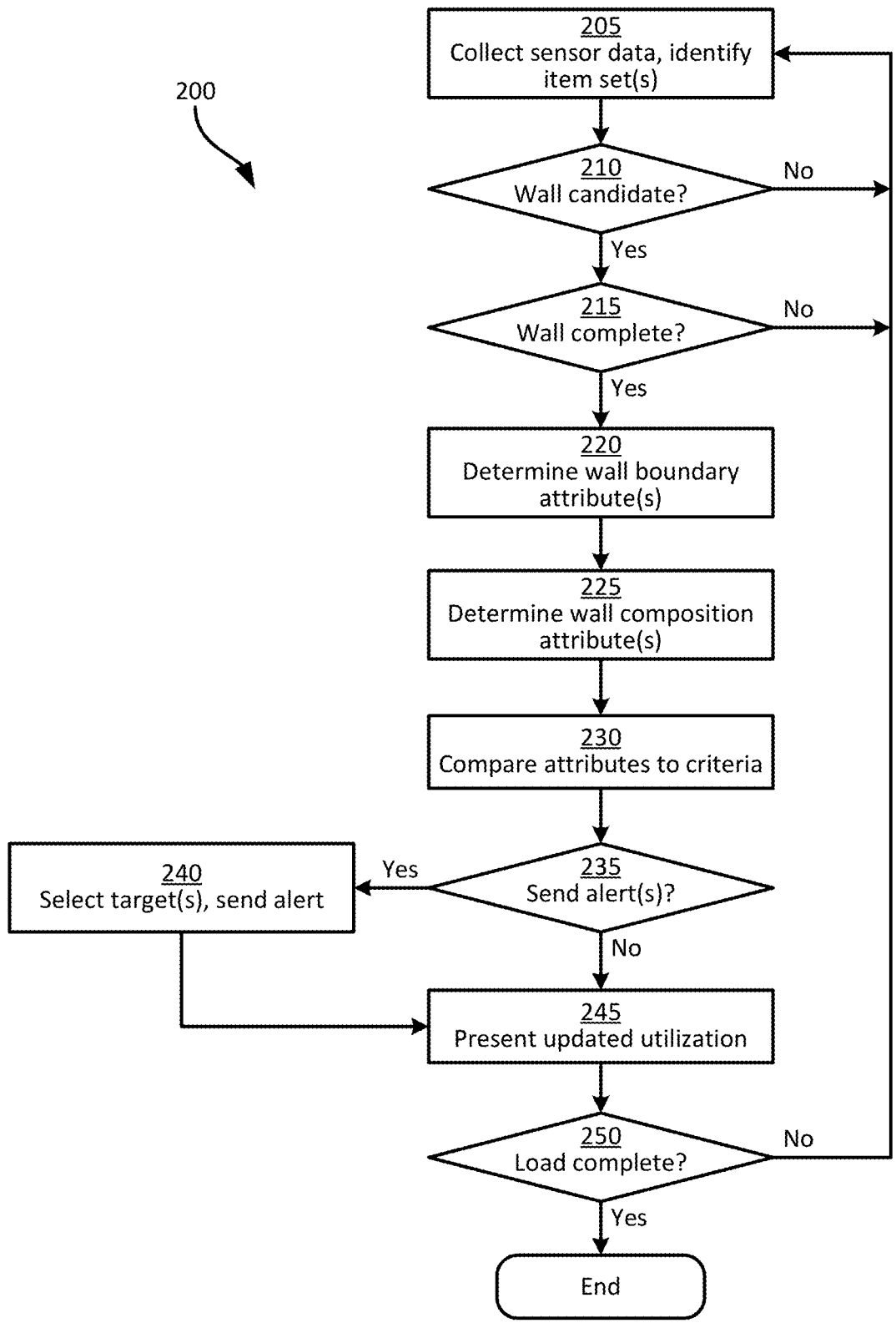
FIG. 2 is a flowchart of a method of container load quality monitoring and feedback.

Turning to FIG. 2, a method 200 of monitoring load quality is shown. The method 200 will be described in conjunction with an example performance of the method 200 within the system 100. In particular, the blocks of the method 200 are performed by the server 128 in this example, as configured via execution of the application 162.

Before initiation of the performance of the method 200, the server 128 can be configured to determine whether the load process has entered an active load stage. For instance, the load process from the arrival of the container 112 at the load bay 108-2, to the departure of the container 112 from the load bay 108-2, can be divided into distinct stages, one of which includes the placement of the items 120 into the container 112. The server 128 can be configured to monitor other performance attributes related to the above-mentioned stages, but the assessments and outcomes defined in the method 200 may be limited to the stage in which the items 120 are placed into the container 112 (referred to as the active load stage).

At block 205, the server 128 is configured to control the sensor assembly 136-2 to capture sensor data depicting the interior of the container 112. The sensor data can include, as noted earlier, an image depicting the interior of the container 112, a point cloud depicting the interior of the container 112, or both an image and a point cloud. Based on the sensor data, the server 128 is configured to identify sets of items in the container 112. The identification of a set of items can be performed, in some examples, by fitting one or more planar surfaces to the sensor data, or other suitable object detection mechanisms. In the present example, the server 128 can be configured to determine whether a substantially vertical surface can be fit to the sensor data, between the far wall of the container 112 (i.e. the wall opposite the open end 114) and the open end 114. Such a surface likely indicates the presence of a set of items 120 having been placed in the container 112.

Figure 3:
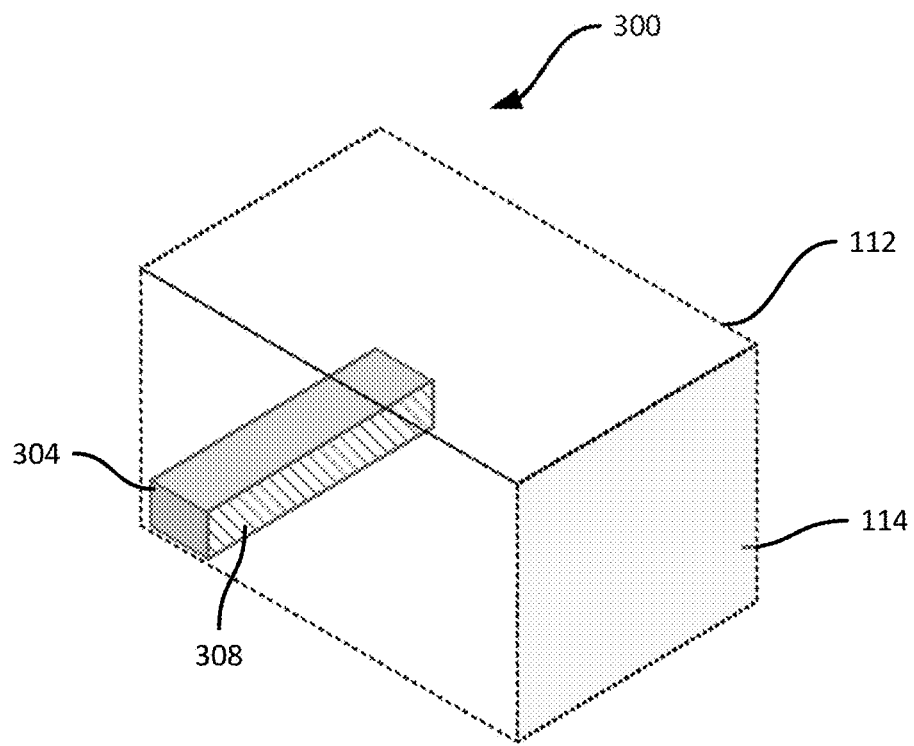
FIG. 3 is a diagram illustrating an example performance of blocks 205 and 210 of the method of FIG. 2.
Figure 3:
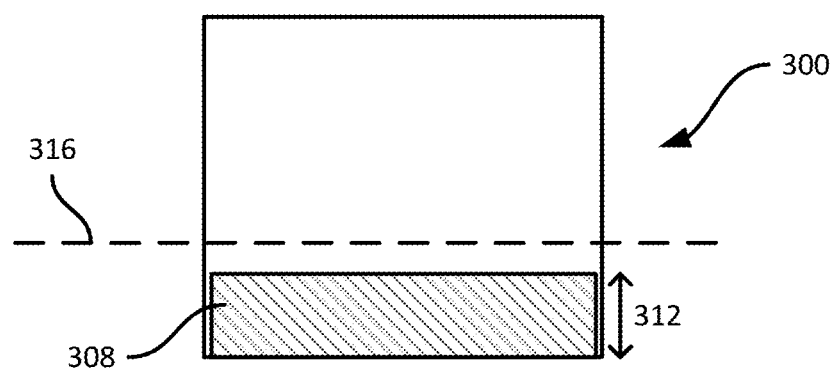

Turning to FIG. 3, sensor data 300 is illustrated, with the container 112 shown in dashed lines. The sensor data indicates the presence of a set 304 of items within the container 112, e.g. at a rear wall thereof (opposite the open end 114). Depending on the nature of the sensor data and the positioning of the sensor assembly 136, only a forward surface of the set 304 may be shown in the sensor data, or both the forward surface and a top surface of the set 304 may be visible. The server 128 can be configured, for example, to detect the set 304 by fitting a planar surface 308 to the forward surface of the set 304. In some instances, multiple sets of items 120 may be detected, while in others, no sets of items may be detected (e.g. if too few items 120 are present in the container 112 to fit a plane with sufficient accuracy).

Returning to FIG. 2, at block 210 the server 128 is configured to determine whether any sets of items identified at block 205 represent candidate walls. As will be apparent to those skilled in the art, items 120 may be moved into the container 112 and placed in a staging area, prior to final placement for transport. The determination at block 210 seeks to distinguish sets of items that are merely staged (and therefore likely to be moved in the near future) from sets of items that have been placed in their final positions for transport. While items 120 that have been used to construct walls are generally not moved afterwards, and are therefore indicative of load performance and/or wall quality, staged items 120 may not be indicative of load performance and/or wall quality.

For example, the server 128 can be configured to determine whether any set of items 120 identified at block 205 has a height exceeding a lower threshold. The lower threshold is set to exclude staged items, which may be placed directly on a floor of the container 112 (i.e. which are less likely to be stacked on top of one another). Returning to FIG. 3, the server 128 can be configured to identify a height 312 of the surface 308, and compare the height 312 to a predetermined lower threshold 316. As will be apparent, although the threshold 316 is shown in FIG. 3, the depiction of the threshold 316 is purely for illustration alongside the height 312. The threshold 316 itself does not appear in the sensor data from block 205.

As seen in FIG. 3, the height 312 is smaller than the threshold 316. Therefore, the determination at block 210 is negative, and the server 128 returns to block 205. The capture of sensor data and identification of item sets therein is repeated at a configurable interval, e.g. every fifteen seconds. In other examples, more or less frequent data capture operations can be implemented. In other words, following a negative determination at block 210, the server 128 awaits the next set of captured sensor data (e.g. the next image frame and/or point cloud), and repeats the identification of item sets and determination at block 210.

Figure 4:
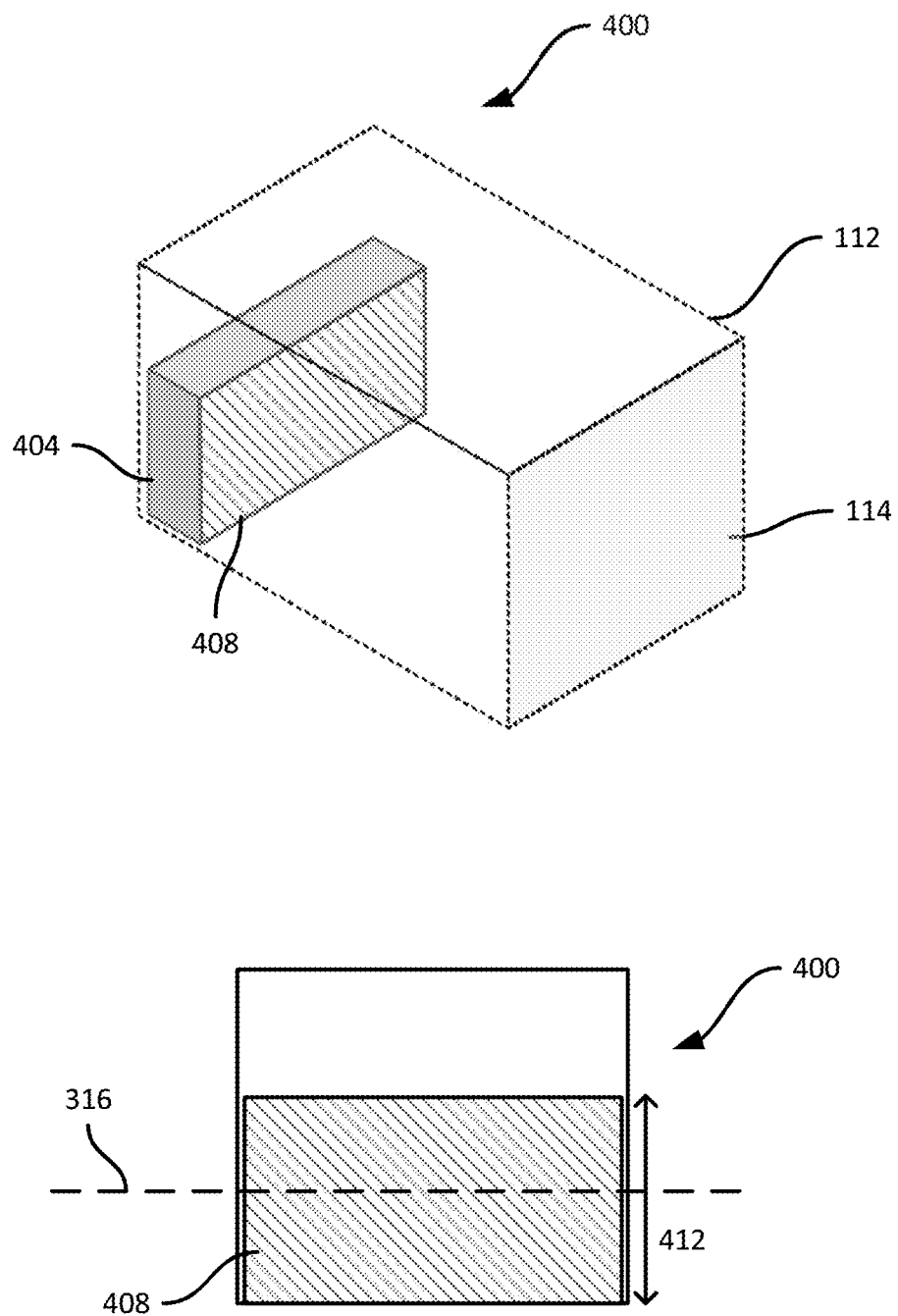
FIG. 4 is a diagram illustrating another example performance of blocks 205 and 210 of the method of FIG. 2.

Turning to FIG. 4, further sensor data 400 is illustrated, e.g. captured some period of time after the sensor data 300, when the loading of the container 112 has progressed. The sensor data 400 depicts a set 404 of items 120 that is larger than the set 304 shown in FIG. 3. At a further performance of block 205 in which the sensor data 400 was captured, the server 128 may also detect the set 404, e.g. by fitting a vertical planar surface 408 to the sensor data 400. As seen in the lower portion of FIG. 4, a height 412 of the surface 408 exceeds the threshold 316, and the determination at block 210 is therefore affirmative.

Returning to FIG. 2, having detected a wall candidate at block 210, at block 215 the server 128 is configured to determine whether the wall candidate has been completed. As is apparent from the progression illustrated between FIGS. 3 and 4, the size and/or shape of a wall of items 120 changes over time, as the container 112 continues to be filled. At some point in time, however, items 120 cease being added to a given wall by the worker 116, and the height of that wall remains stable. For instance, the worker 116 may begin constructing a new wall. The performance of block 215 enables the server to perform subsequent assessments of wall quality only when the wall has been completed.

Figure 5:
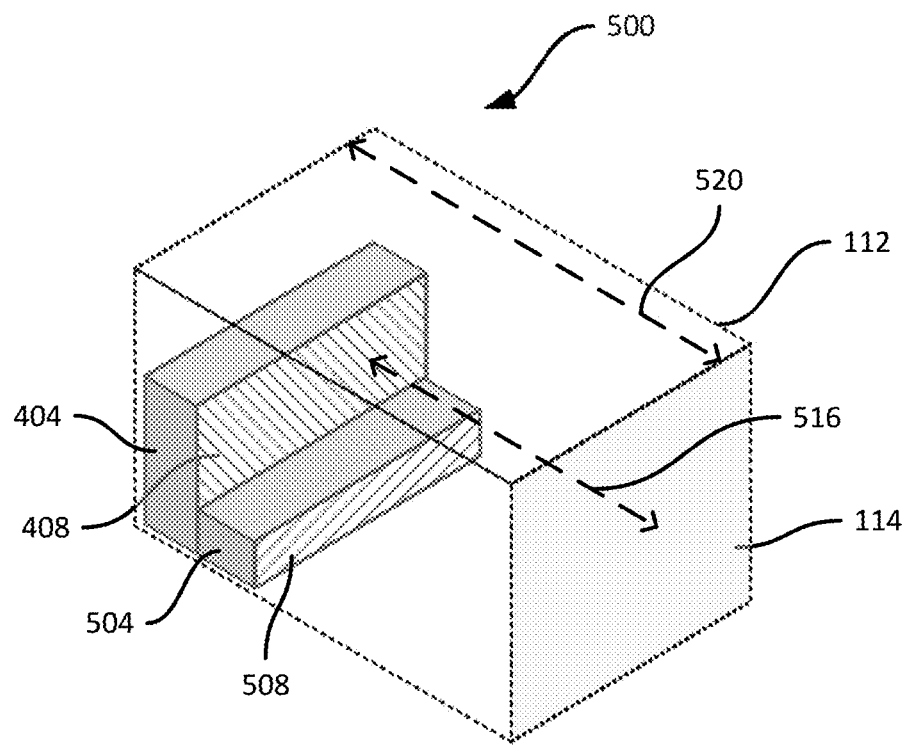
FIG. 5 is a diagram illustrating an example performance of block 215 of the method of FIG. 2.
Figure 5:
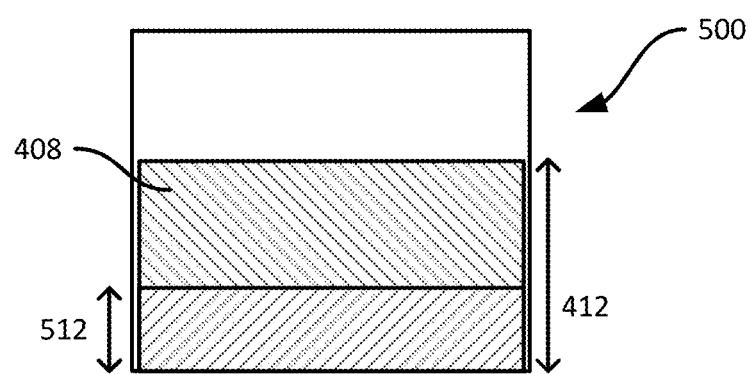

The determination at block 215 can include, in some examples, a determination of whether the height of the wall has changed within a configurable time period. For example, the determination at block 215 may be negative until the surface 408, with the height 412, is detected in two successive data capture operations (i.e. two performances of block 205). In other examples, the determination at block 215 may be negative until a further set of items is detected at block 205, with a smaller depth than the set 404 (i.e. closer to the sensor assembly 136). Turning to FIG. 5, sensor data 500 is shown in which the set 404 and fitted surface 408 with the height 412 are present, and in which construction of a new wall 504 has begun (detected via fitting of a surface 508 to the sensor data 500). In some cases, the determination at block 215 with respect to the set 404 may remain negative until a height 512 of the surface 508 exceeds the threshold at block 210. In some instances, a rearward wall may have items 120 added thereto after a period of stability. For example, items 120 that do not fit into the wall 504 may be placed on the top of the wall 404. In such examples, the determination at block 215 may be repeated for the wall 404 or any other such wall for which a change is detected via blocks 205 and 210.

When the determination at block 215 is negative, the server 128 returns to block 205 to capture further sensor data, for processing as discussed above. As will be apparent, the surfaces (e.g. 408, 508) detected in previous performances of block 205 may be stored in the memory 154, for use in the determination at block 215.

When the determination at block 215 is affirmative, the server 128 is configured to determine various attributes of the completed wall, and to assess a quality of the completed wall via the comparison of the attributes to configurable criteria. In particular, at block 220 the server 128 is configured to determine at least one boundary attribute of the wall for which an affirmative determination was made at block 215. Boundary attributes define geometric dimensions of the wall, such as the height and/or depth, and/or width of the wall. In some examples, as discussed above, the height of the wall is detected earlier for use in the determinations at blocks 210 and 215. At block 220, the server 128 may therefore simply store that height for later use. The server 128 can also be configured to determine a depth of the wall, for example by determining a difference between the depthwise position of the surface of the wall, and the depthwise position of an adjacent rearward surface (either another wall of items, or the rear of the container 112).

FIG. 5 illustrates a depth 516 from the open end 114 of the container to the surface 408, as well as a depth 520 of the container 112 itself. As will be apparent, the difference between the depths 516 and 520 is the depth of the set 404 of items 120 (i.e. the wall 404).

At block 225, the server 128 is configured to determine at least one composition attribute of the wall detected via blocks 205-215. Although the walls shown in FIGS. 3-5 are illustrated as monolithic blocks of items 120, in practice each wall is constructed from numerous items 120 stacked together. The items 120 may have a wide variety of shapes and dimensions, and the worker 116 may be responsible for determining how to arrange the items to form each wall in the container 112. The wall may therefore include voids (i.e. unoccupied spaces between items) of varying positions and sizes, each of which reduces the amount of space in the container 112 that is actually filled. The composition attribute(s) determined at block 225 are indicative of the degree to which the volume defined within the wall boundaries is filled with items 120. As will be apparent, a less efficiently constructed wall (i.e. containing more and/or larger voids) may be at greater risk of collapse, and may also lead to difficulties in reaching a goal utilization of the container 112, because the volume within the container 112 may be less efficiently packed.

Together with the boundary attributes from block 220, the composition attributes can therefore be employed to assess wall quality, and issue alerts to one or more client devices 124 under some conditions, to inform the worker 116 and/or supervisor 132 of wall attributes to be improved for subsequent walls.

The composition attribute(s) determined by the server 128 can include a spatial center of gravity attribute. To determine the spatial center of gravity attribute, the server 128 can be configured to distinguish between portions of the wall that are occupied by items 120, and portions of the wall that define voids (i.e. where no items 120 are present). The above wall portions can be identified from image data, e.g. with shaded portions of an image corresponding to voids, and/or from point cloud data, e.g. with portions of the wall having greater depths than the surface fitted to the wall corresponding to voids. The occupied portions and voids can be represented in two dimensions, e.g. on the surface fitted to the wall.

Figure 6:
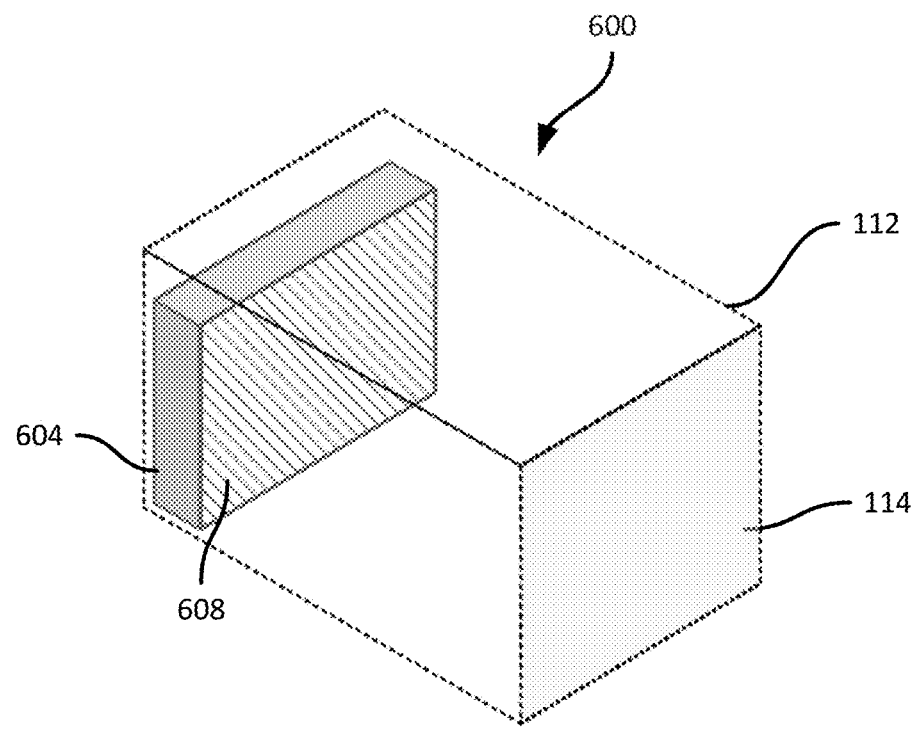
FIG. 6 is a diagram illustrating an example performance of block 225 of the method of FIG. 2.
Figure 6:
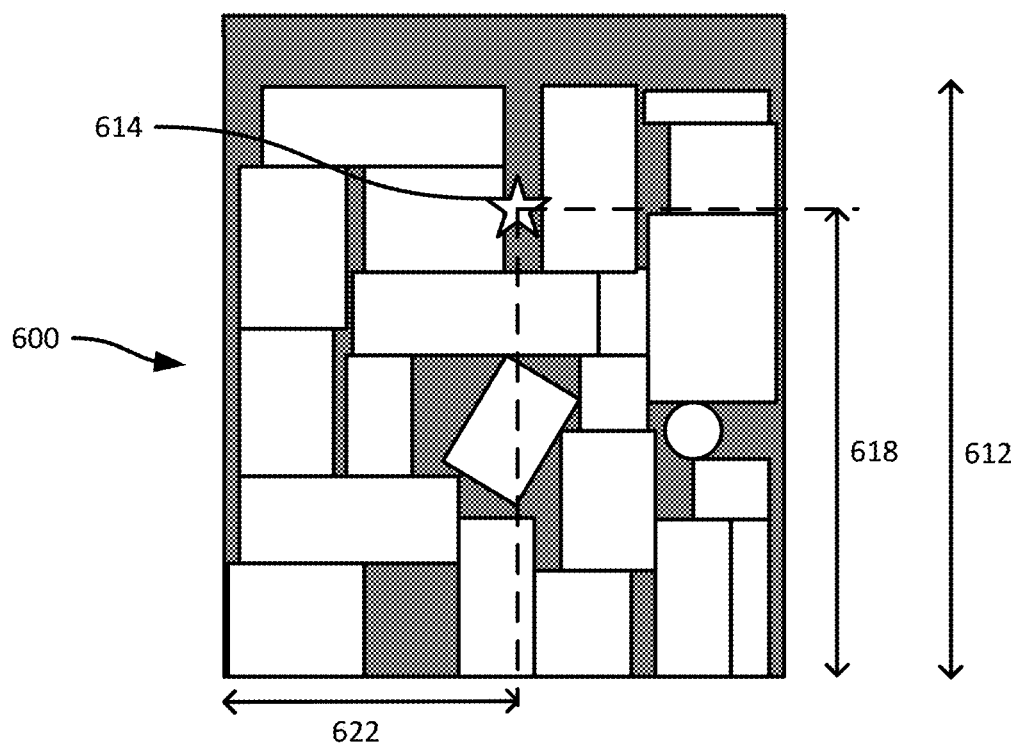

Turning to FIG. 6, sensor data 600 is shown depicting an example wall 604 is illustrated, having a forward surface 608 (e.g. detected at block 205). As noted above, the isometric depiction of the sensor data 600 is simplified. The lower portion of FIG. 6 illustrates the actual appearance of the wall 704 at the surface 608. As will be apparent, certain portions of the wall 604, indicated in white, are occupied by items 120. Other portions, indicated in gray, are voids. That is, while the boundary attributes of the wall 604, including the height 612, define the outer extents of the wall 604, the boundary attributes alone may not fully describe the quality of the wall 604.

Having identified the two-dimensional extents of the occupied portions and voids in the wall, the server 128 is configured to determine the spatial center of gravity by finding the centroid of the occupied areas. For example, the spatial center of gravity of the wall 604 is the centroid 614, which can be defined by a vertical position 618 (e.g. measured from the bottom of the container 112, parallel to the height 612), and a horizontal position 622 (e.g. measured from one side of the container 112, orthogonally to the height 612).

Figure 7:
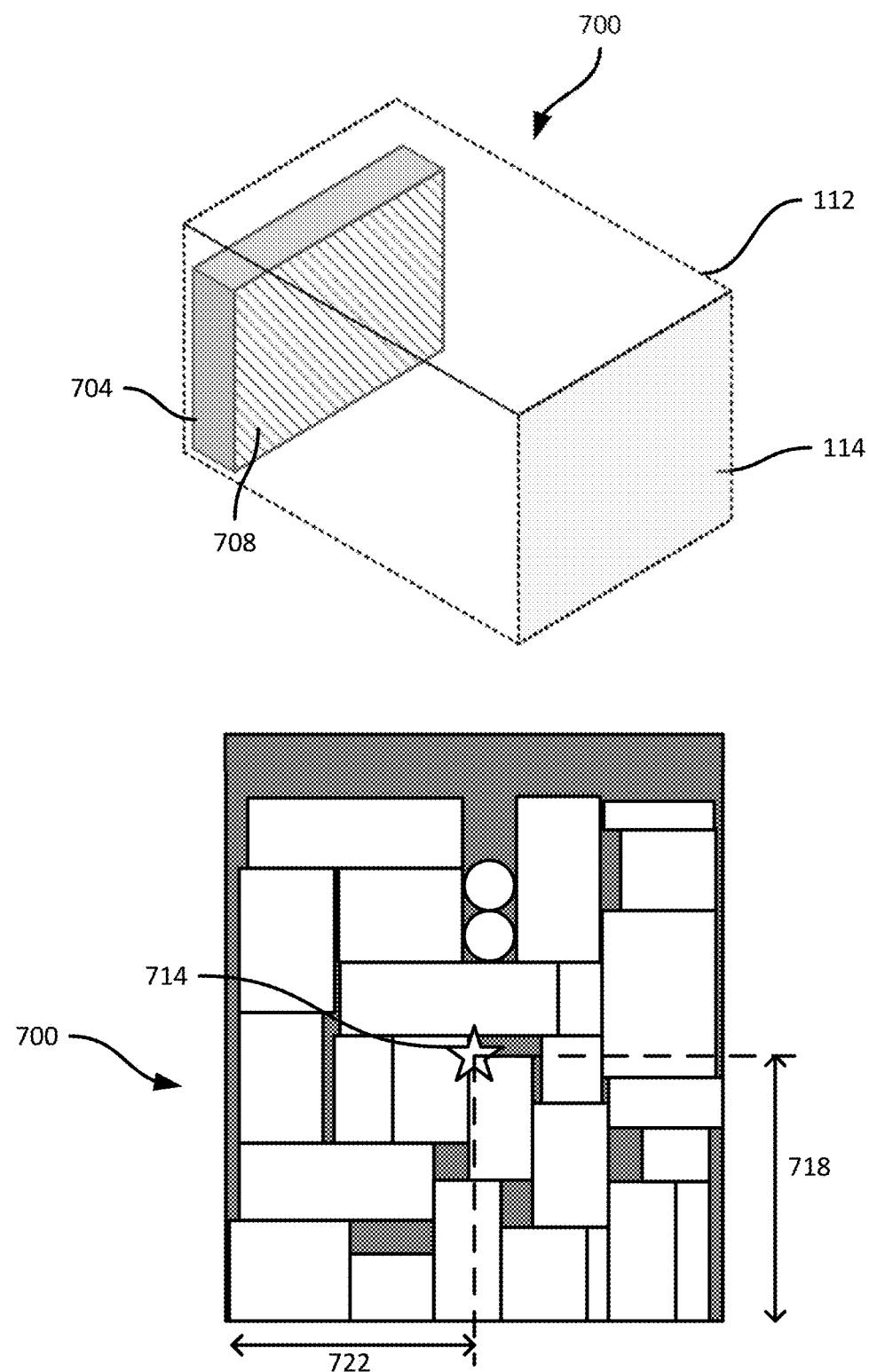
FIG. 7 is a diagram illustrating another example performance of block 225 of the method of FIG. 2.

As shown in FIG. 6, the centroid 614 is in the upper third of the wall 604, as a result of numerous and/or large voids particularly in the lower portions of the wall 608. FIG. 7 illustrates another example wall 704 and forward surface 708, in which the voids are smaller than those shown in FIG. 6, particularly in the lower half of the wall 704. As a result, the centroid 714 has a vertical position 718 that is at a smaller height than the vertical position 618. As will also be apparent from FIG. 7, the horizontal position 722 of the centroid 714 is displaced to one side relative to the horizontal position 622.

In other examples, the composition attribute can include, instead of or in addition to the spatial center of gravity, a proportion of the wall that is occupied and/or a proportion of the wall that is unoccupied. That is, having distinguished the occupied areas from the voids as noted above, the server 128 can be configured to determine a ratio of the total area of the occupied areas to the total area of the wall's forward surface. The server 128 can also be configured to determine a ratio of the total area of the voids to the total area of the forward surface. As will be apparent, a greater ratio of occupied areas indicates more efficient wall construction (i.e. more efficient utilization of the container volume).

Referring again to FIG. 2, at block 230 the server 128 is configured to compare the attributes from blocks 220 and 225 to one or more criteria. Specifically, the boundary attributes are compared to corresponding boundary criteria, and the composition attributes are compared to corresponding composition criteria. Based on the outcome of such comparisons, flags or other state indicators may be set (e.g. in the memory 154) in association with the wall, for subsequent use in generating status information and/or alerts.

For example, at block 230 the server 128 can be configured to retrieve boundary criteria from the memory 154, in the form of configurable thresholds for either or both of wall height and wall depth. For example, if the wall height does not exceed a height threshold, or if the wall depth does not exceed a depth threshold, the wall is considered to fail the boundary criteria, and a first status indicator can be set in association with the wall (e.g. an insufficient boundary warning indicator). In some examples, the boundary criteria can also include a configurable upper threshold for the wall height. For instance, an operator of the facility 104 may set a maximum wall height, e.g. to reduce the risk of injury to workers 116 or the like. When the maximum height is exceeded, the server 128 can set a second status indicator (e.g. a boundary exceedance warning indicator) in association with the wall.

The server 128 can also be configured to compare the composition attribute(s) to configurable thresholds at block 230. For example, the server 128 can be configured to compare the height 618 of the spatial center of gravity 614 to a threshold height. If the height 618 exceeds the threshold height, the wall may contain a sufficient number of voids to risk collapsing, and a third status indicator (e.g. a top-heavy warning indicator) may be set in association with the wall. In further examples, a ratio of occupied areas of the wall to total wall area can be compared to a threshold ratio. When the ratio does not exceed the threshold, the server 128 can set a fourth warning indicator (e.g. an insufficient density warning indicator) in association with the wall.

At block 235, the server 128 is configured to determine whether to generate and send any alerts, based on the status indicators set via the comparison(s) from block 230. For example, the server 128 can be configured at block 235 to compare the status indicators set at block 230 to one or more thresholds and/or other criteria. In some examples, the determination at block 235 can be based on a status indicator threshold, such that the determination is affirmative when the number of status indicators set (regardless of which status indicators are set) exceeds the threshold. In further examples, the server 128 can make an affirmative determination at block 235 when a specific status indicator is set, regardless of whether the other status indicators are set. For example, the determination at block 235 may be affirmative if the above-mentioned top-heavy indicator is set, irrespective of whether any other status indicators are set for the wall.

In further examples, the server 128 can apply a count-based threshold, such that the determination at block 235 is affirmative if at least a threshold number of consecutive walls have at least one (or another suitable number) of status indicators set.

When the determination at block 235 is affirmative, the server 128 proceeds to block 240, at which the server 128 generates and sends any relevant alerts to selected target client devices 124. The client devices 124 selected to receive the alert at block 240 can be selected based on stored associations between client devices 124 and load bays 108, for example. For example, the server 128 may maintain, or access when such information is maintained at another computing device, a list of client computing devices 124 associated with the load bay 108-2, such as the devices operated by the worker 116 and the supervisor 132.

Figure 8:
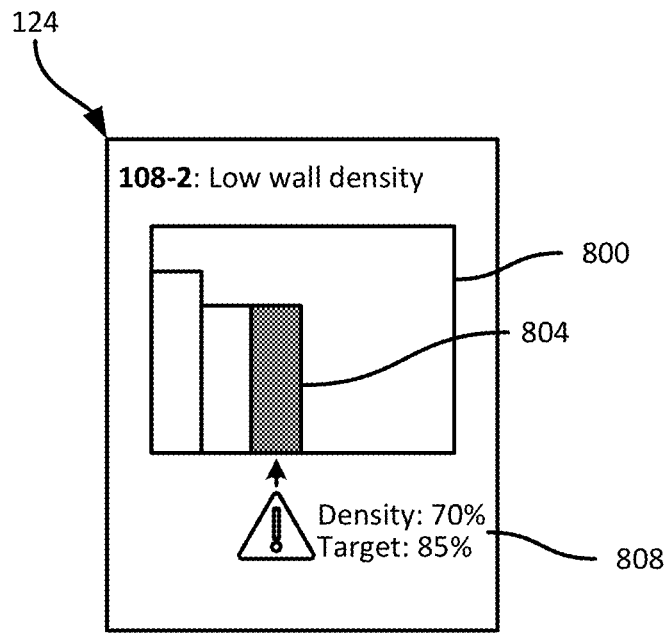
FIG. 8 is a diagram illustrating an example alert generated at block 240 of the method of FIG. 2.

FIG. 8 illustrates an example alert presented on a display of a client device 124 following the performance of block 240 at the server 128. The alert can include, for example, a graphical representation 800 of the container 112, e.g. viewed from the side. The wall 804 to which the alert relates can be highlighted (e.g. shaded or colored), and the alert can include an indication 808 of the nature of the alert. In the illustrated example, the alert indicates that the wall 804 has an insufficient density warning indicator associated therewith. The alert can present, as shown in FIG. 8, the observed density of the wall 804 (e.g. 70% occupied and therefore 30% voids), as well as the threshold (85% occupied in this example) that led to the alert as a result of not being met.

Returning to FIG. 2, at block 245, either following transmission of any alerts at block 240 or following a negative determination at block 235, the server 128 can be configured to present an updated utilization for the container 112, e.g. via one or more of the client devices 124. The utilization can be determined at the server 128 by summing the volume of each previously detected wall according to the boundary attributes from block 220, and determining the ratio of the total volume of all detected walls to the internal volume of the container 112. The utilization can also be provided to other computing devices, and/or other processes executed at the server 128 itself, e.g. for monitoring load performance and generating alerts and/or recommendations based on utilization.

Figure 9:
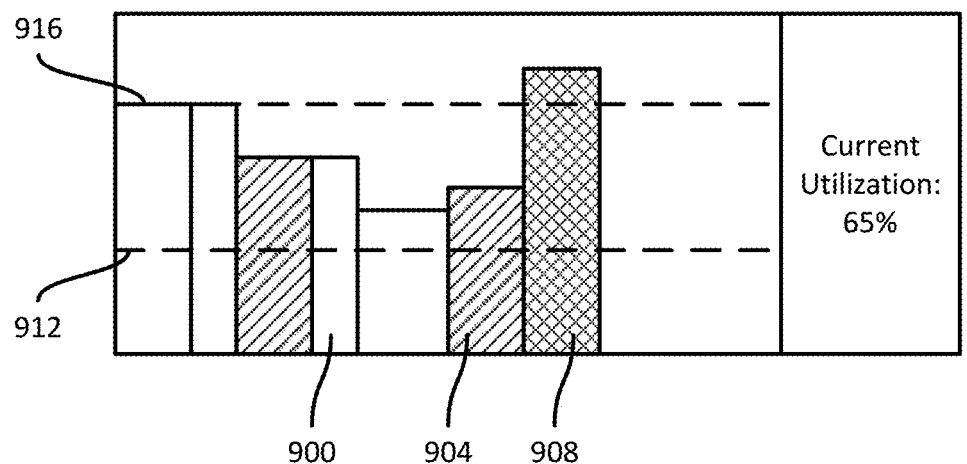
FIG. 9 is a diagram illustrating example utilization data presented at block 245 of the method of FIG. 2.

Turning to FIG. 9, example utilization data is illustrated, e.g. as presented via a computing device 124. The utilization data can include a side view of the container 112, with each detected wall illustrated according to its boundary attributes (i.e. height and depth). The walls may also be color-coded or otherwise marked to indicate assessed quality levels, e.g. based on the number and/or type of status indicators set for each wall. For example, a first wall 900 has a first visual appearance (e.g. a green-colored fill) indicating that no status indicators are set for that wall. A second wall 904 has a second visual appearance (e.g. a yellow-colored fill) indicating that one status indicator is set for that wall. A third wall 908 has a third visual appearance (e.g. a red-colored fill), indicating that two or more status indicators are set for that wall. In further examples, additional visual features such as patterns, outlines, textual labels or the like can be applied to walls based on which status indicators are set.

The utilization data can also include a current utilization (e.g. 65% in the illustrated example), determined as noted above. As will now be apparent, the utilization metric may enable a more accurate determination of how much of the internal volume of the container 112 is filled, compared to an alternative approach of determining fullness of the container 112 based solely on the foremost wall (the wall 908 in this case). The utilization data can also be presented, in some examples, along with at least some of the criteria evaluated at block 230. For example a minimum expected wall height 912 and a maximum allowable wall height 916 can be indicated.

Following the presentation of utilization data at block 245, the server 128 determines at block 250 whether the load process is complete. When the determination at block 250 is negative, the performance of the method 200 continues at block 205. Otherwise, performance of the method 200 ends.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of generating feedback for a container load process, the method comprising:
   during a load process for a container at a load bay, controlling a sensor assembly disposed at the load bay to capture sensor data depicting an interior of the container;
   at a computing device connected to the sensor assembly, detecting, based on the sensor data, a wall of items placed in the container interior;
   determining, at the computing device from the sensor data:
      (i) a boundary attribute of the detected wall, and
      (ii) a composition attribute of the detected wall;
   comparing, at the computing device, (i) the boundary attribute to a boundary criterion, and (ii) the composition attribute to a composition criterion; and
   responsive to at least one of (i) the boundary attribute not meeting the boundary criterion, or (ii) the composition attribute not meeting the composition attribute, generating an alert for transmission to a client computing device.

2. The method of claim 1, further comprising:
   generating, based on the boundary attribute, a utilization metric for the container; and
   presenting the utilization metric to the client computing device.

3. The method of claim 2, further comprising:
   detecting, based on the sensor data, a plurality of further walls of items placed in the container interior;
   for each of the further walls, determining a respective boundary attribute and composition attribute; and
   updating the utilization metric based on the detected wall and the detected further walls.

4. The method of claim 1, wherein detecting the wall includes:
   identifying a set of items having a height exceeding a detection threshold; and
   determining that the height is stable.

5. The method of claim 4, wherein determining that the height is stable includes: determining that the height has not changed for a threshold time period.

6. The method of claim 4, wherein determining that the height is stable includes: detecting a further wall between the wall and the sensor assembly.

7. The method of claim 1, wherein the boundary attribute includes a height of the wall;
   wherein the boundary criterion includes a height threshold; and
   wherein the alert includes an indication of insufficient wall height when the height does not exceed the height threshold.

8. The method of claim 7, wherein the boundary attribute further includes a depth of the wall;
   wherein the boundary criterion further includes a depth threshold; and
   wherein the alert includes an indication of insufficient wall depth when the depth does not exceed the depth threshold.

9. The method of claim 1, wherein the composition attribute includes a spatial center of gravity of the wall;
   wherein determining the composition attribute includes identifying (i) occupied regions containing items in the wall, and (ii) empty regions in the wall, and determining a centroid of the occupied regions; and
   wherein the composition criterion includes a height threshold for the spatial center of gravity.

10. A computing device, comprising:
   a communications interface connecting the computing device with a client computing device; and
   a processor configured to:
      during a load process for a container at a load bay, control a sensor assembly disposed at the load bay to capture sensor data depicting an interior of the container;
      detect, based on the sensor data, a wall of items placed in the container interior;
      determine, at the computing device from the sensor data:

(i) a boundary attribute of the detected wall, and
(ii) a composition attribute of the detected wall;
compare (i) the boundary attribute to a boundary criterion, and (ii) the composition attribute to a composition criterion; and
responsive to at least one of the boundary attribute not meeting the boundary criterion, or the composition attribute not meeting the composition attribute, generate an alert for transmission to a client computing device.

11. The computing device of claim 10, wherein the processor is further configured to:
generate, based on the boundary attribute, a utilization metric for the container; and
present the utilization metric to the client computing device.

12. The computing device of claim 11, wherein the processor is further configured to:
detect, based on the sensor data, a plurality of further walls of items placed in the container interior;
for each of the further walls, determine a respective boundary attribute and composition attribute; and
update the utilization metric based on the detected wall and the detected further walls.

13. The computing device of claim 10, wherein the processor is configured, to detect the wall, to:
identify a set of items having a height exceeding a detection threshold; and
determine that the height is stable.

14. The computing device of claim 13, wherein the processor is configured, to determine that the height is stable, to: determine that the height has not changed for a threshold time period.

15. The computing device of claim 13, wherein the processor is configured, to determine that the height is stable, to: detect a further wall between the wall and the sensor assembly.

16. The computing device of claim 10, wherein the boundary attribute includes a height of the wall;
wherein the boundary criterion includes a height threshold; and
wherein the alert includes an indication of insufficient wall height when the height does not exceed the height threshold.

17. The computing device of claim 16, wherein the boundary attribute further includes a depth of the wall;
wherein the boundary criterion further includes a depth threshold; and
wherein the alert includes an indication of insufficient wall depth when the depth does not exceed the depth threshold.

18. The computing device of claim 10, wherein the composition attribute includes a spatial center of gravity of the wall;
wherein the processor is configured, to determine the composition attribute, to identify occupied regions containing items in the wall and empty regions in the wall, and determine a centroid of the occupied regions; and
wherein the composition criterion includes a height threshold for the spatial center of gravity.

19. A system, comprising:
a sensor assembly disposed at a load bay; and
a computing device configured to:
during a load process for a container at the load bay, control the sensor assembly disposed at the load bay to capture sensor data depicting an interior of the container;
detect, based on the sensor data, a wall of items placed in the container interior;
determine, at the computing device from the sensor data:
(i) a boundary attribute of the detected wall, and
(ii) a composition attribute of the detected wall;
compare (i) the boundary attribute to a boundary criterion, and (ii) the composition attribute to a composition criterion; and
responsive to at least one of the boundary attribute not meeting the boundary criterion, or the composition attribute not meeting the composition attribute, generate an alert for transmission to a client computing device.

* * * * *